(12) United States Patent
Cromer et al.

(10) Patent No.: US 7,400,648 B2
(45) Date of Patent: Jul. 15, 2008

(54) VIRTUAL USB COMMUNICATIONS PORT

(75) Inventors: Daryl Carvis Cromer, Apex, NC (US); Brandon John Ellison, Raleigh, NC (US); Eric Richard Kern, Durham, NC (US); Howard Jeffrey Locker, Cary, NC (US); Edward Stanely Suffern, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 793 days.

(21) Appl. No.: 10/856,066

(22) Filed: May 28, 2004

(65) Prior Publication Data

US 2005/0265385 A1 Dec. 1, 2005

(51) Int. Cl.
*H04J 3/22* (2006.01)

(52) U.S. Cl. .................................... 370/466

(58) Field of Classification Search ............... None
See application file for complete search history.

(56) References Cited

U.S. PATENT DOCUMENTS

| | | | |
|---|---|---|---|
| 6,385,197 B1 | 5/2002 | Sugihara | |
| 6,563,821 B1 | 5/2003 | Hong et al. | |
| 6,567,403 B1 | 5/2003 | Congdon et al. | |
| 6,950,895 B2 * | 9/2005 | Bottom | 710/301 |
| 7,012,815 B2 * | 3/2006 | Garnett et al. | 361/825 |
| 2002/0048280 A1 | 4/2002 | Lee et al. | |
| 2002/0188709 A1 * | 12/2002 | McGraw et al. | 709/223 |
| 2003/0131136 A1 * | 7/2003 | Emerson et al. | 709/250 |
| 2003/0137978 A1 | 7/2003 | Kanetake | |
| 2003/0147387 A1 | 8/2003 | Devi et al. | |

* cited by examiner

*Primary Examiner*—Frank Duong
(74) *Attorney, Agent, or Firm*—Cynthia S. Byrd; Dillon & Yudell LLP

(57) ABSTRACT

A method and system for accessing a remote real communication port ("COM port") from a server blade in a server blade chassis by creating a virtual COM port in the server blade. A basic input/output system (BIOS) controller monitors an internal COM port in the server blade for communication traffic. Upon detecting the communication traffic, the BIOS controller reroutes the traffic to a virtual USB COM port created by the BIOS controller chipset. The virtual USB COM port directs the communication traffic to an internal universal serial bus (USB) device in the server blade. The USB device then forwards the traffic to an Ethernet media access controller (MAC) input/output (I/O) on a sideband channel to a remote system, which passes the communication traffic to a real COM port in the remote system.

4 Claims, 6 Drawing Sheets

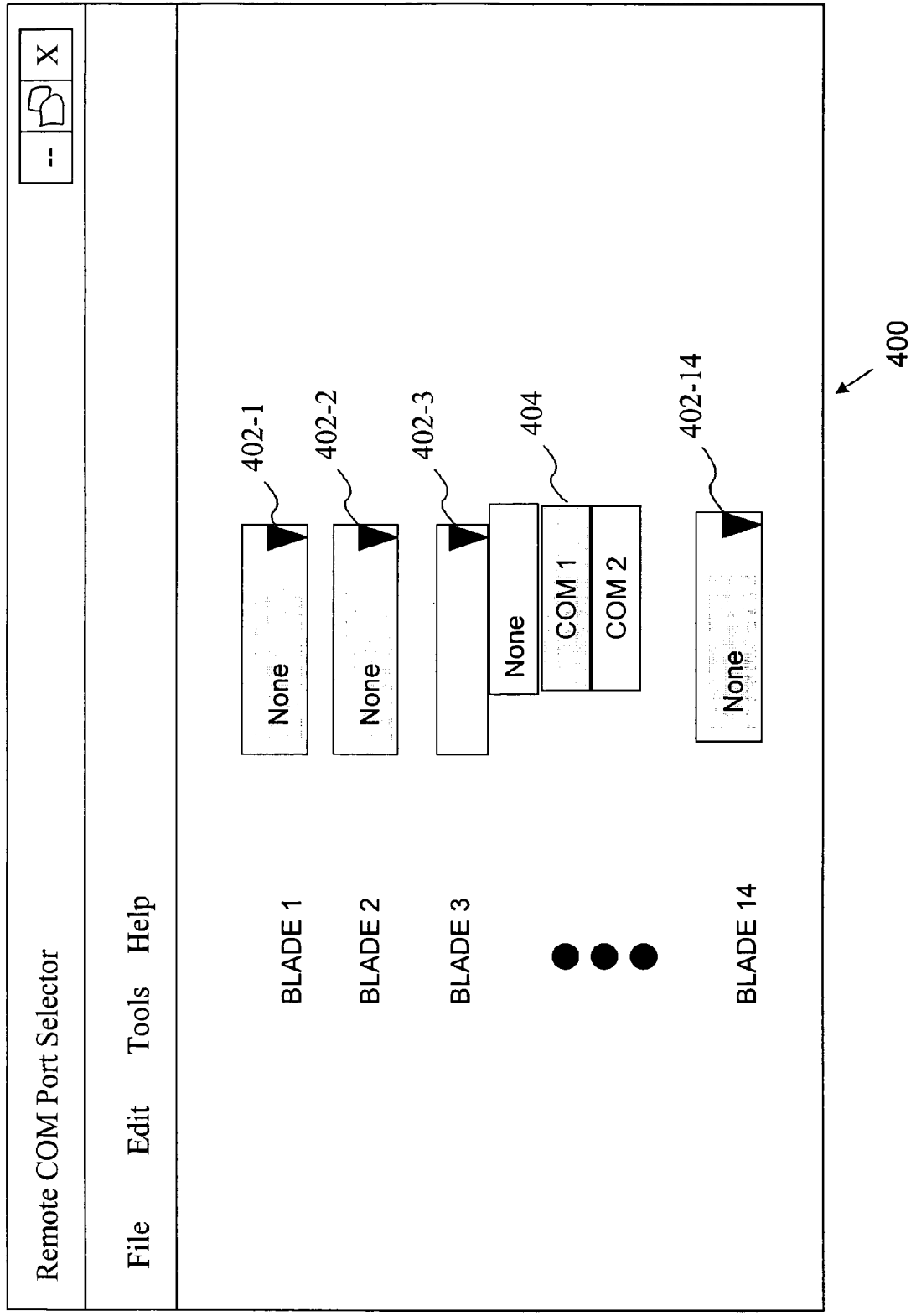

VIRTUAL USB COMMUNICATIONS PORT

BACKGROUND OF THE INVENTION

1. Technical Field

The present invention relates in general to the field of computers, and in particular to multiple blade servers housed in a server chassis. Still more particularly, the present invention relates to a method and system for a providing a virtual communications port to servers, in the server chassis, that do not have a real communications port.

2. Description of the Related Art

Server blade computers offer high-density server boards (blades) in a single server blade chassis (blade center chassis). A typical server blade computer is illustrated in FIG. 1, identified as server blade chassis 102. Server blade chassis 102 includes multiple hot-swappable server blades 104a-n. There are typically fourteen server blades 104 in server blade chassis 102. The operations of server blades 104 are coordinated by logic identified as management modules 108, each of which typically includes a processor for controlling input/output (I/O) functions, and allocating jobs and data to the different server blades 104. Typically, a first management module 108a is designated as the primary management module, and a second management module 108b is a back-up to be used if the primary management module 108a should fail. Another function of management module 108 is to control a power module 110 and cooling fans 112.

While communication to server blades 104 is typically possible via switches (not shown), many processes, such as remote consoles and debuggers that run under Linux™ and Windows™ require a serial communications port ("COM port"). These processes communicate with service processors (not shown) in the server blades. These service processors need to be accessed by the processes via a serial COM port. However, server blades 104 in a server blade chassis 102 do not have individual COM ports, primarily due to the integrated nature of the server blade chassis 102. A potential solution to this problem would be to have all server blades 104 share a common COM port on a backplane (not shown) in the server blade chassis 102. However, this solution is problematic since only one of the fourteen server blades 104 would be accessible at any give time.

What is needed, therefore, is a method and system that allows all server blades 104 in a server blade chassis 102 to be connected to an external COM port, and to allow simultaneous communication sessions to be established with each server blade 104. The method and system should be able to handle higher bandwidth requirements for Video redirect and code upgrades, as well as other data intensive communications.

SUMMARY OF THE INVENTION

Therefore, the present invention is directed to a method and system for accessing a remote real communication port ("COM port") from a server blade in a server blade chassis by creating a virtual COM port in the server blade. A basic input/output system (BIOS) controller monitors an internal COM port in the server blade for communication traffic. Upon detecting the communication traffic, the BIOS controller reroutes the traffic to a virtual USB COM port created by the BIOS controller chipset. The virtual USB COM port directs the communication traffic to an internal universal serial bus (USB) device in the server blade. The USB device then forwards the traffic to an Ethernet media access controller (MAC) input/output (I/O) on a sideband channel to a remote computer system, which passes the communication traffic to a real COM port in the remote computer system.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 2b depicts additional detail of a server blade in the server blade chassis illustrated in FIG. 2a;

FIG. 4 illustrates a graphical user interface (GUI) for setting up a remote COM port for use with a specified server blade.

DETAILED DESCRIPTION OF A PREFERRED EMBODIMENT

Figure 1:
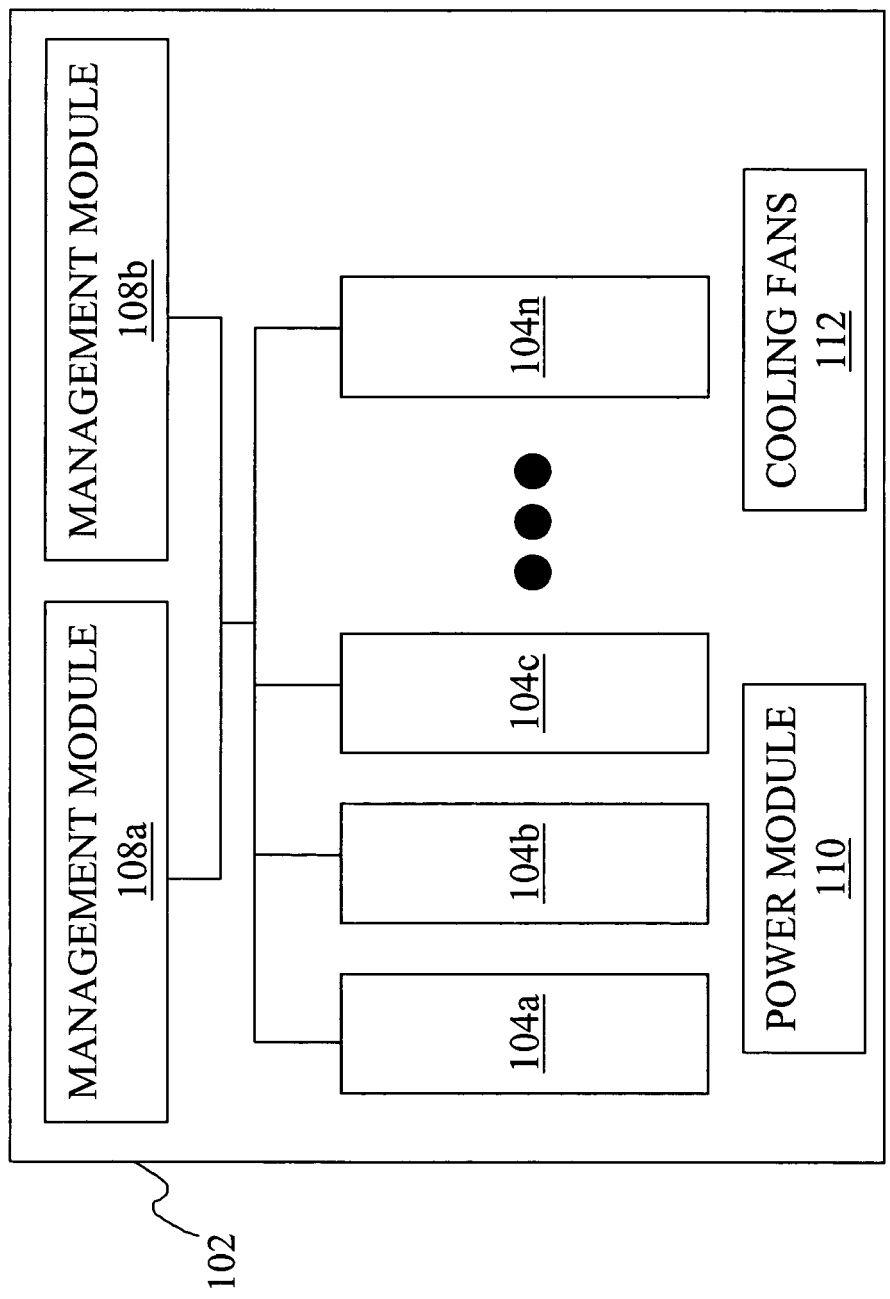
FIG. 1 depicts a prior art diagram of a server blade chassis.
Figure 2A:
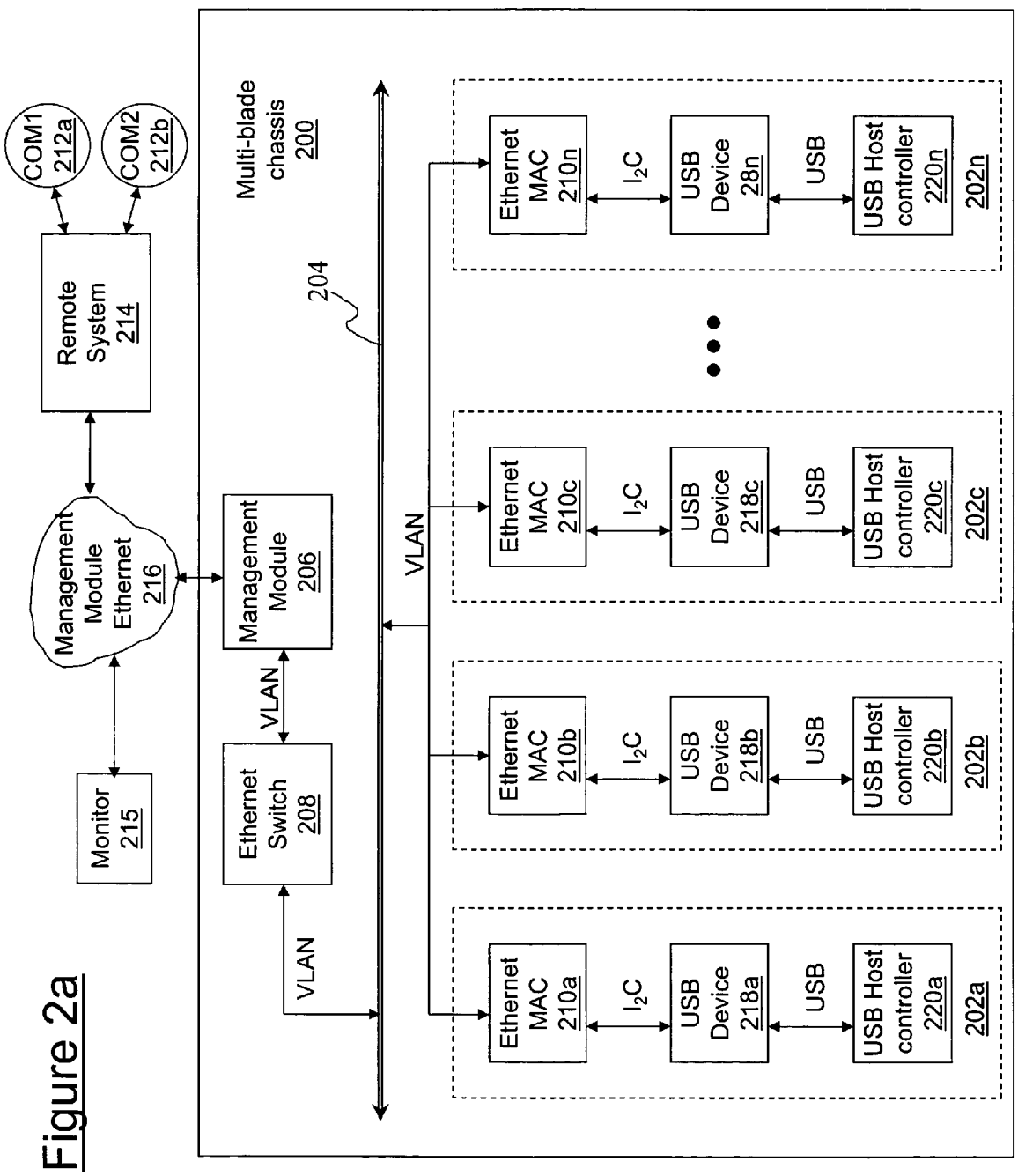
FIG. 2a illustrates a server blade chassis coupled to a remote system having communication ports (COM ports) to be used by server blades in the server blade chassis in accordance with the present invention.

With reference now to FIG. 2a, there is depicted a schematic block diagram of a server blade chassis 200 according to a preferred embodiment of the present invention. For the sake of clarity, only four server blades 202a,b,c,n are depicted. However, in a preferred embodiment, server blade chassis 200 has a midplane 204 capable of connecting fourteen or more server blades 202. (Midplane 204 is similar in function to a backplane, to which server blades 202 are attached, but is referenced as a "midplane" due to its preferred location in the middle of the server blade chassis 200 rather than at the back of the server blade chassis 200.)

Server blade chassis 200 has one or more management modules 206. Although only a single management module 206 is depicted, server blade chassis 200 preferably has a primary management module 206 and a back-up management module 206 (not shown). Management module 206 is capable of managing multiple server blades 202. Management module 206 communicates with server blades 202 via a Virtual Local Area Network (VLAN) that couples the management module 206 to an Ethernet switch 208, the Ethernet switch 208 to the midplane 204, and the midplane 204 to an Ethernet Media Address Controller (MAC) Input/Output (I/O) 210.

In the present invention, inbound serial communication traffic from a server blade 202 is transmitted to and from a real remote communication port (COM port) 212. The pathway for this serial communication traffic is from the COM port 212 (e.g., COM port 212a) to a remote system 214, such as a laptop computer. The traffic then goes, via a management module Ethernet 216, to the management module 206 associated with the server blade chassis 200. From the management module 206, the traffic travels across the VLAN to the Ethernet switch 208 in the server blade chassis 200, and then on to the midplane 204. The traffic then continues via the VLAN to the Ethernet MAC 210 (e.g., Ethernet MAC 210a) in the server blade 202 (e.g., server blade 202a). From Ethernet MAC 210, the traffic is decoded, and then sent, via an Inter-Integrated Circuit (I₂C) line that is compliant with the Phillips' Inter-IC (Inter-Integrated Circuit) standard (incorporated by reference in its entirety herein and commonly referred to as "I₂C"), to an internal USB device 218 (e.g., USB device 218a). Note that the USB device 218 is strictly an internal USB device, and is not able to communicate outside of the server blade 202. From the USB device 218 the traffic is sent to the USB host controller 220 (e.g., USB host controller 220a) via an internal USB line. From the USB host controller 220, the traffic is manipulated by logic shown in FIG. 2b.

Figure 2B:
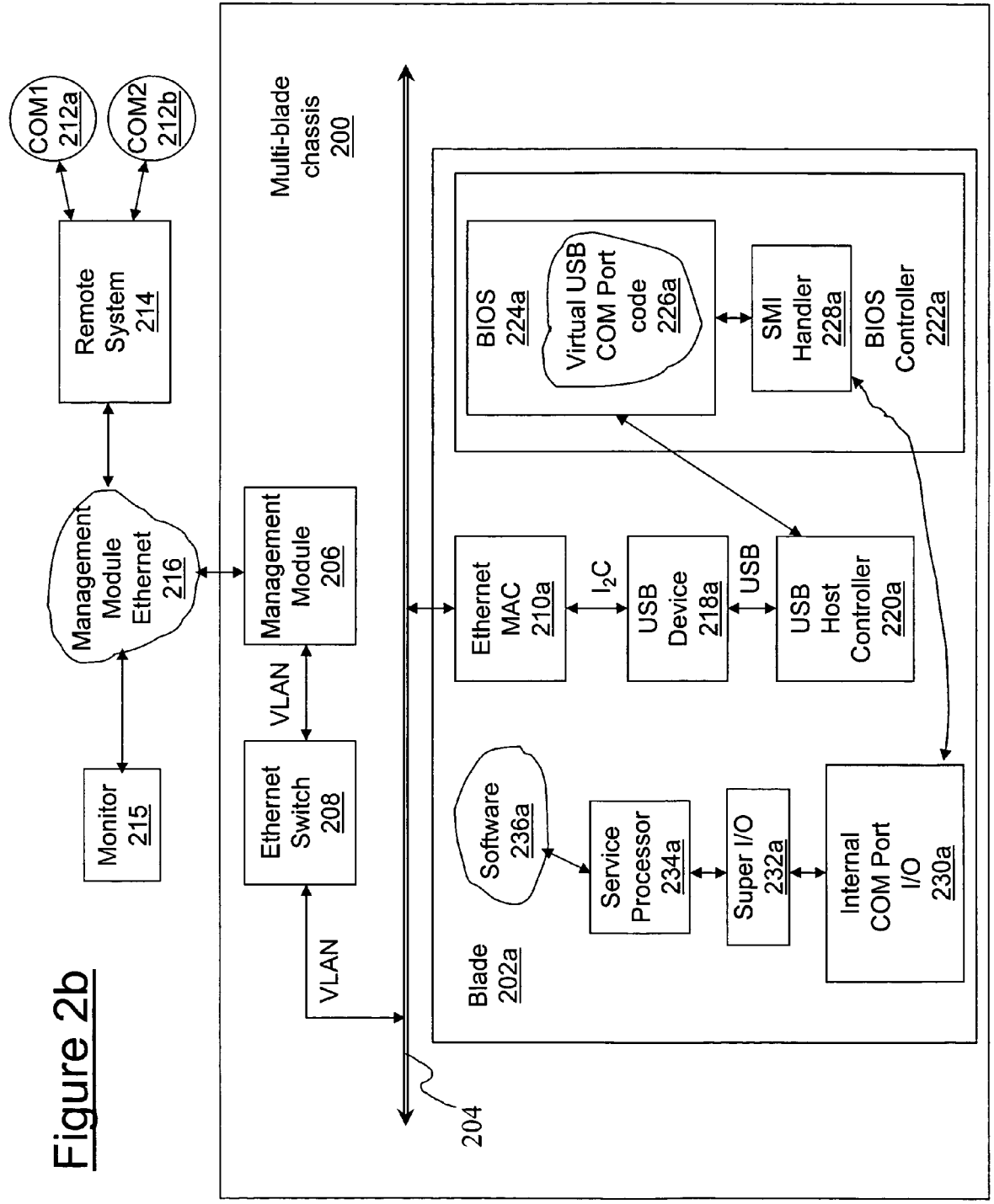

Referring then to FIG. 2b, additional detail of the operation of server blade 202a as contemplated by the present invention is given. Detailed components for server blade 202a are given an "a" suffix in their identifying numerals, with the understanding that each server blade 202 has a duplicate of each component shown in server blade 202a.

When the communication traffic described in FIG. 2a reaches USB host controller 220a, a Basic Input/Output System (BIOS) controller 222a detects the arrival of the traffic. This detection causes an System Management Interrupt (SMI) handler 228a to issue an SMI to the USB host controller 220a, causing the USB host controller 220a to send the traffic to a virtual USB COM port defined by a virtual USB COM port code 226a in a BIOS 224a. That is, the virtual USB COM port code 226a creates a virtual COM port in software, with which the USB host controller 220a can communicate. The virtual USB COM port then forwards to traffic to an internal COM (ICOM) port 230, which is an input/output (I/O) to a super I/O 232a. The traffic continues to a service processor 234a, which directs the traffic on to appropriate software 236a that processes the traffic.

Note that the data traffic in multi-blade chassis 200 can communicated either in-band or out-of-band. Normal management data traffic is in-band, and is transmitted across a management network (not shown) that comports with the Electronics Industry Association (EIA) RS485 Standard for data communication. Communication traffic going to and from real COMs 212, as described by the present invention, is out-of-band, communicating across the Ethernet switch 208, and thus does not collide with in-band management network traffic.

Communication traffic outbound from software 236a follows a similar pathway as the inbound communication traffic described above, except that the SMI handler 228a issues an SMI in response to activity at the ICOM port I/O 230a. That is, when communication data from software 236a, via service processor 234a and super I/O 232a, reaches ICOM port I/O 230a, BIOS controller 222a detects the arrival of the traffic at the ICOM port I/O 230a, and causes the SMI handler 228a to issue an SMI to the ICOM port I/O 230a to redirect the traffic to the virtual USB port described above. The virtual USB port then directs the traffic on to the USB host controller 220a, from which it continues to the real COM port 212 in the pathway described above.

Figure 3A:
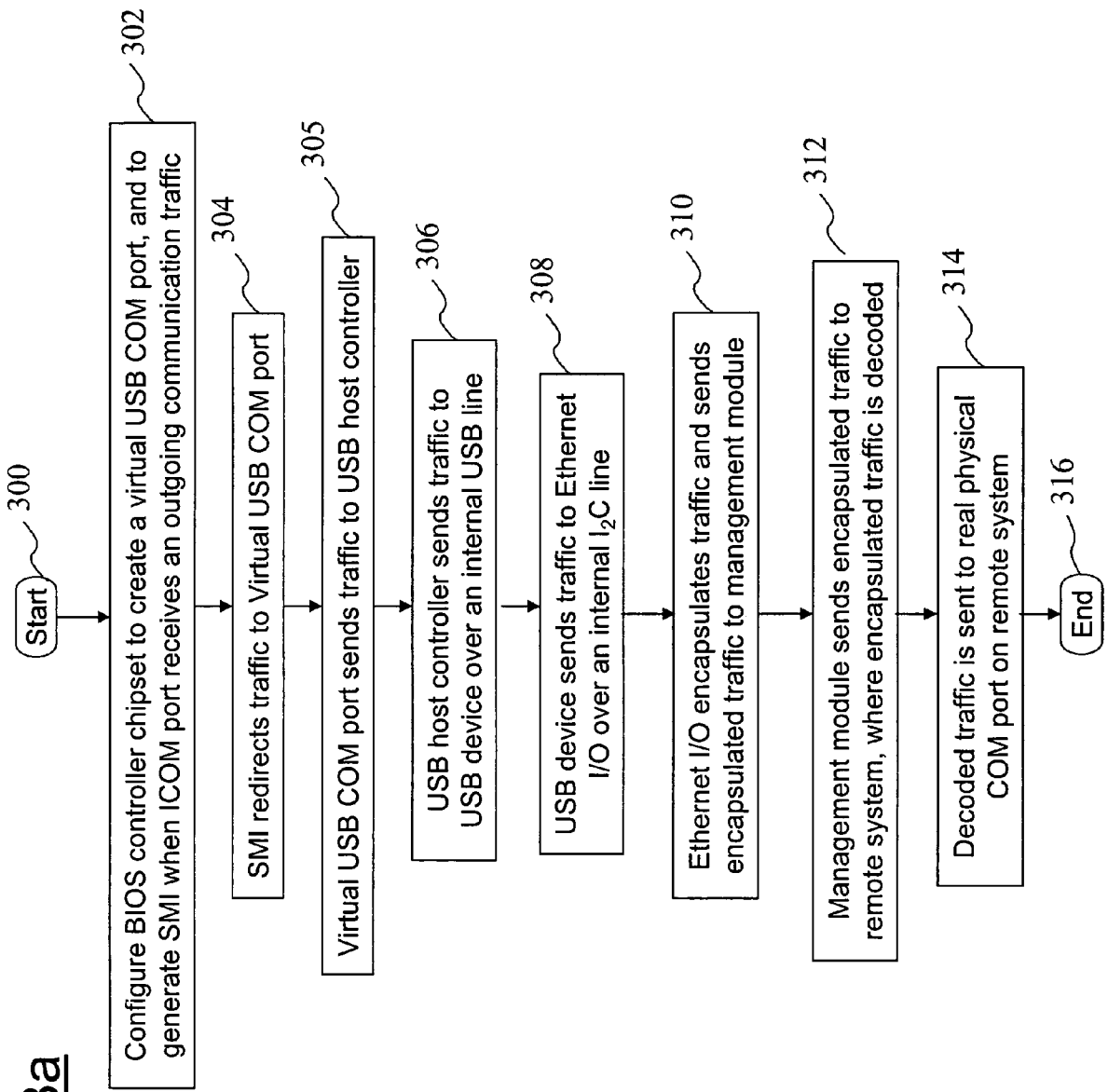
FIG. 3a is a flow chart of steps used in the present invention to send communication traffic from the server blade to a COM port on the remote system.

Referring now to FIG. 3a, there is illustrated a flow-chart of steps taken to send outgoing communication traffic from a server blade to a remote COM port. After initiator block 300, the BIOS controller chipset is configured to create a virtual USB COM port, and to generate an SMI whenever the Internal COM (ICOM) I/O port receives outgoing communication traffic (block 302) as described above in FIG. 2b. The SMI causes the outgoing communication traffic to be redirected to the virtual USB COM port (block 304), and then on to the USB host controller (block 305). The USB host controller then sends the traffic to an internal USB device over an internal USB line (block 306). The USB device then sends the traffic to the Ethernet MAC I/O device over an internal I₂C line (block 308), where it is encapsulated, preferably using an Internet Protocol, and sent to the management module in the multi-blade chassis (block 310). The management module then forwards the encapsulated traffic over a sideband on a management module Ethernet to a remote system such as a laptop or other computer (block 312), where the traffic is decoded (un-encapsulated). The decoded outgoing traffic is then sent to a real physical COM port associated with the remote system (block 314), allowing the traffic to be sent out on any appropriate network (not shown in the figures) as needed, and the process is ended (terminator block 316).

Figure 3B:
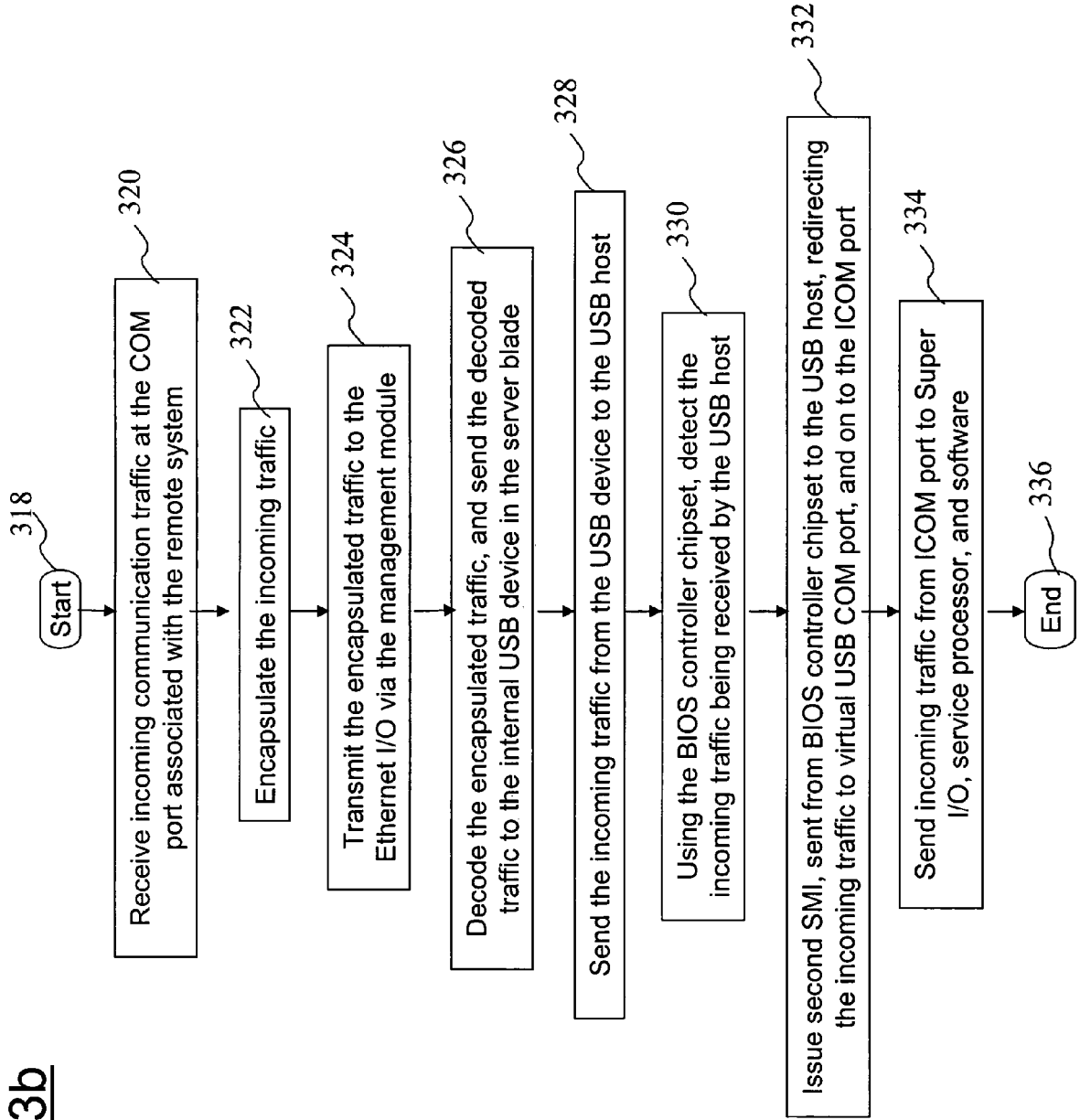
FIG. 3b is a flow chart of steps used in the present invention to send communication traffic from the COM port on the remote system to the server blade.

FIG. 3b illustrates steps taken to receive incoming communication traffic at the blade server from the remote COM port. After initiator block 318, the incoming communication traffic is received at the real physical COM port in the remote system (block 320), where the incoming communication traffic is encapsulated (block 322) and transmitted on the sideband of the management module Ethernet to the management module and then on to the Ethernet I/O switch (block 324). The incoming communication traffic is decoded in the Ethernet I/O switch, and then sent to the internal USB device in the server blade (block 326), and then on to the USB host (block 328), where the incoming communication traffic is detected by the BIOS controller chipset (block 330). The BIOS controller chipset issues a second SMI to the USB host, redirecting the incoming communication traffic to the virtual USB COM port previously set up, and then on to the ICOM I/O port (block 332). From the ICOM I/O port, the incoming traffic is sent to the software via the super I/O and service processor (block 334), and the process is ended (terminator block 336).

The process of setting up which real COM port is to be used by the server blade is performed by the management module 206 illustrated in FIG. 2b. To assist the administrator who decides which COM port to use, a graphical user interface (GUI) 400, as shown in an exemplary manner in FIG. 4, is presented on a monitor 215 (as depicted in FIGS. 2a,b). In the GUI 400 is a listing of all server blades in the server blade chassis, listed in FIG. 4 as Blades 1-14. Next to each blade listing is a drop-down or similar selection menu 402, allowing a COM port to be selected or not selected for each server blade. For example, as shown in FIG. 4, the administrator has chosen COM 1 depicted in active window 404, as the real COM port to be used by Blade 3. By clicking active window 404, the management module will direct the BIOS controller chipset 222 (shown in FIG. 2b) to establish a virtual USB COM port to emulate the real COM port 1 (212b) shown in FIG. 2b.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   configuring a Basic Input/Output System (BIOS) controller chipset in a computer to generate a first System Management Interrupt (SMI) when an internal communication port (ICOM port) receives an outgoing communication traffic;
   in response to the ICOM port receiving the outgoing communication traffic, the first SMI redirecting the outgoing communication traffic to a Universal Serial Bus (USB) host in the computer;
   transmitting the outgoing communication traffic from the USB host controller to a USB device in the computer, the USB device being capable of only internal communication between the USB host controller, via an internal USB compliant line, and an Ethernet input/output (I/O) device in the computer via an internal Inter Integrated Circuit ($I_2C$) compliant line;
   transmitting the outgoing communication traffic from the USB device to the Ethernet I/O device;
   encapsulating the outgoing communication traffic in the Ethernet I/O device;
   transmitting, on a sideband channel that is different from a management channel, the encapsulated outgoing communication traffic to a management module associated with the multi-computer chassis;
   transmitting the encapsulated outgoing communication traffic from the management module to a remote system;
   decoding the encapsulated outgoing communication traffic in the remote system; and
   transmitting the decoded outgoing communication traffic to a real physical communications port (COM port) associated with the remote system.

2. The method of claim 1, wherein the computer is a server blade in a multi-blade chassis.

3. The method of claim 2, further comprising:
   receiving an incoming communication traffic, destined to the computer in the multi-computer chassis, at the COM port associated with the remote system;
   encapsulating the incoming communication traffic at the remote system;
   transmitting the encapsulated incoming communication traffic from the remote system to the Ethernet I/O device via the management module;
   decoding the encapsulated incoming communication traffic in the Ethernet I/O device;
   transmitting the decoded incoming communication traffic from the Ethernet I/O device to the USB device in the computer;
   transmitting the incoming communication traffic from the USB device to the USB host controller;
   detecting, by the BIOS controller chipset, the incoming communication traffic being received by the USB host controller; and
   in response to the BIOS controller chipset detecting the receipt of the incoming communication traffic at the USB host controller, the BIOS controller chipset issuing a second SMI to the USB host controller redirecting the incoming communication traffic from the USB host controller to the ICOM port.

4. A method comprising:
   configuring a Basic Input/Output System (BIOS) controller chipset in a computer to generate a first System Management Interrupt (SMI) when an internal communication port (ICOM port) receives an outgoing communication traffic from the computer, and wherein the computer is a server blade in a multi-blade chassis;
   in response to the ICOM port receiving the outgoing communication traffic, the first SMI redirecting the outgoing communication traffic to a virtual communication port generated by the BIOS controller chipset; wherein the virtual communication port is a virtual universal serial bus (USB) communication port;
   transmitting the outgoing communication traffic from the virtual communication port to a real communication port associated with a remote system;
   transmitting the outgoing communication traffic from the virtual USB communication port to a USB host controller in the computer;
   transmitting the outgoing communication traffic from the USB host controller to an Ethernet MAC Input/Output (I/O) device in the computer;
   transmitting the outgoing communication traffic from the Ethernet MAC I/O device to a management module associated with the multi-blade chassis;
   transmitting the outgoing communication traffic from the management module to the real communication port associated with the remote system;
   receiving an incoming communication traffic, destined to the computer in the multi-computer chassis, at the COM port associated with the remote system;
   encapsulating the incoming communication traffic at the remote system;
   transmitting the encapsulated incoming communication traffic from the remote system to the Ethernet I/O device via the management module;
   decoding the encapsulated incoming communication traffic in the Ethernet I/O device;
   transmitting the decoded incoming communication traffic from the Ethernet I/O device to the USB device in the computer;
   transmitting the incoming communication traffic from the USB device to the USB host controller; detecting, by the BIOS controller chipset, the incoming communication traffic being received by the USB host controller; and
   in response to the BIOS controller chipset detecting the receipt of the incoming communication traffic at the USB host controller, the BIOS controller chipset issuing a second SMI to the USB host controller redirecting the incoming communication traffic from the USB host controller to the ICOM port.

* * * * *